(12) United States Patent
Hargrove et al.

(10) Patent No.: US 12,517,047 B2
(45) Date of Patent: Jan. 6, 2026

(54) TRANSPORT AND DETECTION OF EXPLOSIVE SAMPLES

(71) Applicant: ALTI LLC, Highland Park, IL (US)

(72) Inventors: James McChesney Hargrove, Highland Park, IL (US); Monica Maheshbhai Mahida, Highland Park, IL (US)

(73) Assignee: ALTI LLC, Highland Park, IL (US)

( * ) Notice: Subject to any disclaimer, the term of this patent is extended or adjusted under 35 U.S.C. 154(b) by 115 days.

(21) Appl. No.: 18/416,267

(22) Filed: Jan. 18, 2024

(65) Prior Publication Data

US 2025/0237601 A1 Jul. 24, 2025

(51) Int. Cl.
*G01N 21/39* (2006.01)
*G01N 33/22* (2006.01)

(52) U.S. Cl.
CPC ........... *G01N 21/39* (2013.01); *G01N 33/227* (2013.01)

(58) Field of Classification Search
CPC .............................. G01N 21/39; G01N 33/227
USPC ......................................................... 356/440
See application file for complete search history.

(56) References Cited

U.S. PATENT DOCUMENTS

| | | |
|---|---|---|
| 3,430,482 A | 3/1969 | Dravnieks et al. |
| 3,528,779 A | 9/1970 | Fontijn |
| 3,647,387 A | 3/1972 | Benson et al. |
| 3,652,227 A | 3/1972 | Harman, III et al. |
| 3,877,875 A | 4/1975 | Jones et al. |
| 3,934,991 A | 1/1976 | Frain et al. |
| 5,092,218 A | 3/1992 | Fine et al. |
| 5,854,077 A | 12/1998 | Wolfson et al. |
| 5,906,946 A | 5/1999 | Sausa et al. |
| 6,051,436 A | 4/2000 | Reagen et al. |

(Continued)

FOREIGN PATENT DOCUMENTS

| | | | | |
|---|---|---|---|---|
| CN | 108562550 A | * | 9/2018 | ................. G01J 3/42 |
| CN | 112557490 A | * | 3/2021 | ............ G01N 27/622 |

OTHER PUBLICATIONS

Brown, "Absorption spectroscopy in high-finesse cavities for atmospheric studies." Chem. Rev. 103 (5219-5238 (2003).

(Continued)

*Primary Examiner* — Md M Rahman
(74) *Attorney, Agent, or Firm* — Heidi Eisenhut; LOZA & LOZA, LLP

(57) ABSTRACT

An apparatus for transporting an explosive or volatile material may include a vial configured to contain a sample of explosive dissolved in a solvent, and an airtight container which contains the vial. 0.1 mg of the explosive or volatile material may be dissolved in 0.1 ml of the solvent. The solvent may be an alcohol selected from water, methanol, ethanol, propanol, isopropanol, butanol, isobutanol, tert-butanol, acetone, methyl ethyl ketone, dimethyl sulfoxide ethylene glycol, propylene glycol, ethylene glycol monomethylether acetate or propylene glycol monomethylether acetate. A method for transporting an explosive may include providing the apparatus, dissolving 0.1 mg of the explosive in the solvent in the vial; sealing the vial in the airtight container; allowing of the explosive in the solvent in the vial to equilibrate with an atmosphere inside the airtight container; opening the airtight container; and measuring an amount of explosive using a Cavity Ring-down Spectrometer.

22 Claims, 8 Drawing Sheets

(56) References Cited

U.S. PATENT DOCUMENTS

| | | | |
|---|---|---|---|
| 6,346,419 | B1 | 2/2002 | Ryerson et al. |
| 6,419,634 | B1 | 7/2002 | Gaston, IV et al. |
| 6,503,758 | B1 | 1/2003 | Allen et al. |
| 6,635,415 | B1 | 10/2003 | Bollinger et al. |
| RE38,797 | E | 9/2005 | Linker et al. |
| 7,029,920 | B2 | 4/2006 | Lanier et al. |
| 7,301,639 | B1 | 11/2007 | Kebabian et al. |
| 7,323,343 | B2 | 1/2008 | Cox et al. |
| 8,846,407 | B2 | 9/2014 | Hargrove |
| 2004/0053421 | A1 | 3/2004 | Nguyen et al. |
| 2004/0262501 | A1 | 12/2004 | Kajii |
| 2005/0045032 | A1 | 3/2005 | Dasgupta et al. |
| 2006/0081073 | A1 | 4/2006 | Vandrish et al. |
| 2006/0231420 | A1 | 10/2006 | Garzon et al. |
| 2006/0246555 | A1 | 11/2006 | Hawari |
| 2008/0011705 | A1* | 1/2008 | Zemmouri ............... A61J 1/00 141/2 |
| 2008/0134894 | A1 | 6/2008 | Tsai et al. |
| 2008/0159341 | A1 | 7/2008 | Patel et al. |
| 2008/0261322 | A1 | 10/2008 | Burdinski |
| 2009/0027675 | A1 | 1/2009 | Johnson et al. |
| 2009/0113982 | A1 | 5/2009 | Hodyss et al. |
| 2009/0120212 | A1 | 5/2009 | Hargrove et al. |
| 2009/0128819 | A1 | 5/2009 | Van Kesteren et al. |
| 2011/0027899 | A1 | 2/2011 | Hargrove |
| 2021/0172920 | A1* | 6/2021 | Hargrove ............... G01J 3/2803 |

OTHER PUBLICATIONS

Day et al. "A thermal dissociation laser-induced fluorescence instrument for in situ detection of NO2, peroxy nitrates, alkyl nitrates and HNO3." J. of Geophysical Research-Atmospheres, 107:D5-6 (2002).

Hargrove. "Cavity ring-down spectroscopy of Ambient NO2 with quantification and elimination of intereferences." Environ. Sci. Technol. 40, 7868-7873 (2006).

Hargrove. "The application of cavity ring-down spectroscopy to atmospheric and physical chemistry." Dissertation, University of California, Riverside (Dec. 2007).

Kasyutich et al. "Phase-shift off-axis cavity-enhanced absorption detector of nitrogen dioxide." Institute of Physics Publishing, Measurement Science and Technology 17, 923-931 (Mar. 23, 2006).

Kebabian et al. "Detection of nitrogen dioxide by cavity attenuated phase shift spectroscopy." Anal. Chem 77, 724-728 (2005).

Kebabian et al. "A practical alternative to chemiluminescence-based detection of nitrogen dioxide: cavity attenuated phase shift spectroscopy." Environ. Sci. Technol. 42, 6040-6045 (2008).

Lee et al. "Surface chemical characterization using AES/SAM and ToF-SIMS on KOH-impregnated activated carbon by selective adsorption of NOx." Ind. Eng. Chem. Res 40, 3337-3345 (2001).

Mazely et al. "Production of NO2 from photolysis of peroxyacetyl nitrate." J. Phys. Chem 99, 8162-8169 (1995).

Moore. "Instrumentation for trace detection of high explosives." Review of Scientific Instruments, vol. 75, No. 8 (Jul. 26, 2004).

Munson et al. "Laser-based detection methods for explosives." Army Research Laboratory (ARL-TR-4279) (Sep. 2007).

Ramos et al. "Detection of vapors of explosives and explosive-related compounds by ultraviolet cavity ringdown spectroscopy." Applied Optics, vol. 46, No. 4 (Feb. 1, 2007).

Riris et al. "Explosives detection with a frequency modulation spectrometer." Applied Optics, vol. 35, No. 24 (Aug. 20, 1996).

Sadanaga et al. "Development of a measurement system of peroxy radicals using a chemical amplification/laser-induced fluorescence technique." Review of Scientific Instruments, vol. 75, No. 4 (Mar. 10, 2004).

Smith et al. "Trace detection of NO2 by frequency-modulation-enhanced magnetic rotation spectroscopy." J. Opt. Soc. Am. B/vol. 12, No. 6 (Jun. 1995).

Spicer et al. "Overview: MURI Center on spectroscopic and time domain detection of trace explosives in condensed and vapor phases." Proceedings of SPIE vol. 5089 (2003).

Steinfield et al. "New spectroscopic methods for environmental measurement and monitoring." SPIE Conference on Environmental Monitoring and Remediation Technologies, II, Boston, MA (Sep. 1999).

Todd et al. "Application of mid-infrared cavity-ringdown spectroscopy to trace explosives vapor detection using a broadly tunable (6-8 µm) optical parametric oscillator." Appl. Phys. B, 75, 367-376 (2002).

Usachev et al. "Optical properties of gaseous 2,4,6-trinitrotoluene in the ultraviolet region."

Wong et al. "Comparison of IR and UV cavity ring-down spectroscopy detection of transient intermediates: Pyrolysis of methyl azide to form methyleneimine." Science Direct. Spectrochimica Acta Part A 67, 1019-1024 (2007).

* cited by examiner

TRANSPORT AND DETECTION OF EXPLOSIVE SAMPLES

TECHNICAL FIELD

Embodiments are generally related to a device and method to transport and repeatedly detect small samples of explosives for testing and calibration.

BACKGROUND

The transport of explosives samples is heavily regulated, for example, by 37 C.F.R. § 173. Explosives forbidden for transportation include unapproved explosives, chlorate-containing explosives, a leaking or damaged package containing explosives, unstable or deteriorated propellants, nitroglycerin, diethylene glycol dinitrate, or any other liquid explosives, a loaded firearm, fireworks that combine an explosive or a detonator, fireworks containing yellow or white phosphorous, large toy torpedoes, or an explosive article with its means of initiation or ignition installed.

Explosives, including new explosives, are assigned a class and division as follows: Division 1.1 if the major hazard is mass explosion; Division 1.2 if the major hazard is dangerous projections; Division 1.3 if the major hazard is radiant heat or violent burning, or both, but there is no blast or projection hazard; Division 1.4 if there is a small hazard with no mass explosion and no projection of fragments of appreciable size or range; Division 1.4 Compatibility Group S (1.4S) if the hazardous effects are confined within the package or the blast and projection effects do not significantly hinder emergency response efforts. The determination whether or not inclusion in the explosive class is proper depends on if the substance or article does not have significant explosive hazard or if the effects of explosion are completely confined within the article.

Additional concerns for the transport of explosives include environmental and safety. The Occupational Safety and Health Administration sets forth the following classes of explosives: Class A explosives—Possessing, detonating, or otherwise maximum hazard; such as dynamite, nitroglycerin, picric acid, lead azide, fulminate of mercury, black powder, blasting caps, and detonating primers. Class B explosives—Possessing flammable hazard, such as propellant explosives (including some smokeless propellants), photographic flash powders, and some special fireworks. Class C explosives—Includes certain types of manufactured articles which contain Class A or Class B explosives, or both, as components but in restricted quantities. Forbidden or not acceptable explosives—Explosives which are forbidden or not acceptable for transportation by common carriers by rail freight, rail express, highway, or water in accordance with the regulations of the U.S. Department of Transportation, 49 C.F.R. chapter I.

In order to address the possibility that explosives may be needed to calibrate extra sensitive analyzers and used or transported, testing is necessary. For example, TSA checkpoints at airports utilizes Explosives Trace Detection (ETD) tests. The EDT test uses a swab on such things as laptops, shoes, film, cell phones, bags, wheelchairs, hands, casts, etc. The ETD must detect and identify the explosives at the trace levels specified in the sensitive criteria when employed in the operational environment by representative personnel. The sensitive criteria identify the types and quantities of explosive materials (explosive trace) that must be detected, the minimum detection rate for each category of explosive, and the overall detection and maximum nuisance alarm rates. The criteria also specify the requirement to detect the minimum quantity and larger quantities of each listed explosive.

There are conventional methods of detecting small amounts of explosives, including mass spectroscopy, fluorescence methods, chemosensors, chromatography, photoacoustic spectroscopy, or enzyme linked immunoassays (ELISAs). However, these methods frequently entail expensive equipment, highly trained personnel and may be time consuming.

Moreover, samples of the suspected explosive must be transported through the mail or a delivery service to the laboratories where the analytical equipment and the personnel to operate are located. These services forbid the transportation of explosives. This may be addressable by transporting miniscule amounts of the explosive, which causes difficulties in delivering the explosive sample in an intact and in sufficient condition for measurement.

There is accordingly a need for new and improved methods to transport and detect explosive samples.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide an apparatus for transporting an explosive that includes a vial configured to contain a sample of the explosive dissolved in a solvent; and an airtight container which contains the vial. The vial may contain the explosive dissolved in the solvent and 0.1 mg of the explosive may be dissolved in 0.1 ml of the solvent. The solvent may be selected from water, methanol, ethanol, propanol, isopropanol, butanol, isobutanol, tert-butanol, acetone, methyl ethyl ketone, dimethyl sulfoxide ethylene glycol, propylene glycol, ethylene glycol monomethylether acetate and propylene glycol monomethylether acetate. The vial and the container may have labels. The vial may have a screw cap or a septum. The vial may be formed from glass or plastic and the airtight container may be formed from plastic. The apparatus may be sampled by a cavity ring-down spectrometer by sampling just the headspace inside the outer container without opening the vial.

In the disclosure, the explosive may be cyclotrimethylene trinitramine, ammonium perchlorate, ammonium picrate, 1,2-bis-(2,2-difluoro-2-nitroacetoxyethane), black powder, bis (trinitroethyl) carbonate, bis (trinitroethyl) nitramine, 1,2,4-butanetriol trinitrate, calcium nitrate explosive mixture, cellulose hexanitrate explosive mixture, chlorate explosive mixtures, cyclotetramethylenetetranitramine, diaminotrinitrobenzene, diazodinitrophenol, diethyleneglycol dinitrate, dimethylol, dinitroethyleneurea, dinitroglycerine, dinitrophenol, dinitrophenolates, dinitrophenyl hydrazine, dinitroresorcinol, dinitrotoluene-sodium nitrate explosive mixtures, dipicramide; diaminohexanitrobiphenyl, dipicryl sulfide, dipicryl sulfone, dipicrylamine, 2,2-dinitropropyl acrylate, dinitropentano nitrile, ethylene diamine dinitrate, ethylenedinitramine, ednatol, ethyl 4,4-dinitropentanoate, ethylene glycol dinitrate, erythritol tetranitrate explosives, esters of nitro-substituted alcohols, ethyl-tetryl, tetranitromethane (nitroform), fulminate of mercury, fulminate of silver, gelatinized nitrocellulose, guanyl nitrosamino guanyl tetrazene, guanyl nitrosamino guanylidene hydrazine, guncotton, hexanitrodiphenylamine, hexanitrostilbene, hexamethylenetriperoxidediamine, cyclo-1,3,5,7-tetramethylene, 2,4,6,8-tetranitramine, octogen, potassium dinitrobenzo-furoxane, lead azide, lead mannite, lead mononitroresorcinate, lead picrate, mannitol hexanitrate, methyl 4,4-dinitropentanoate, monoethanolamine nitrate, mercuric fulminate, mercury oxalate, mercury tartrate, metriol trinitrate, monomethylamine nitrate; methylamine nitrate, mononitrotoluene-nitroglycerin mixture, nitroisobutametriol trinitrate, nitrate sensitized with gelled nitroparaffin, nitrated carbohydrate explosive, nitrated glucoside explosive, nitrated polyhydric alcohol explosives, nitric acid and a nitro aromatic compound explosive, nitric acid and carboxylic fuel explosive, nitric acid explosive mixtures, nitro aromatic explosive mixtures, nitro compounds of furane explosive mixtures, nitrocellulose explosive, nitroderivative of urea explosive mixture, nitrogelatin explosive, nitrogen trichloride, nitrogen tri-iodide, nitroglycerine, nitroglycide, nitroglycol, nitroguanidine explosives, nitronium perchlorate propellant mixtures, nitroparaffins explosive grade and ammonium nitrate mixtures, nitrostarch, nitro-substituted carboxylic acids, 3-nitro-1,2,4-triazol-5-one, nitrourea, silver acetylide, silver azide, silver fulminate, silver oxalate explosive mixtures, silver styphnate, silver tartrate explosive mixtures, silver tetrazene, sodium azide explosive mixture, sodium dinitro-ortho-cresolate, sodium nitrate explosive mixtures, sodium nitrate-potassium nitrate explosive mixture, sodium picramate, tetranitro-2,3,5,6-dibenzo-1,3a,4, 6a-tetrazapentalene, triaminotrinitrobenzene, triacetonetriperoxide, triethylene glycol dinitrate, tetranitrocarbazole, tetrazene tetracene, tetrazine, 1(5-tetrazolyl)-4-guanyl tetrazene hydrate, tetrazole explosives, tetryl 2,4,6-tetranitro-n-methylaniline, tetrytol, thickened inorganic oxidizer salt slurried explosive mixture, trimethylolethane trinitrate, trinitroethyl formal, trimethylol ethyl methane trinitrate composition, trimethylolthane trinitrate-nitrocellulose, trimonite, trinitroanisole, trinitrobenzene, trinitrobenzenesulfonic acid picryl sulfonic acid, trinitrobenzoic acid, trinitrocresol, trinitrofluorenone, trinitro-meta-cresol, trinitronaphthalene, trinitrophenetol, trinitrophloroglucinol, trinitroresorcinol, tritonal or urea nitrate.

The disclosure, in part, pertains to a method of transporting and measuring an explosive that includes providing the apparatus of the disclosure, dissolving 0.1 mg of the explosive in 0.1 ml of the solvent in the vial; sealing the vial in the airtight container; allowing of the explosive in the solvent in the vial to equilibrate with an atmosphere inside the airtight container; opening the airtight container; and measuring an amount of explosive using a cavity ring-down spectrometer. The atmosphere in the airtight container may be sampled by a cavity ring-down spectrometer on multiple occasions just by the loss leakage from the sealed vial. Opening the vial can cause a more dramatic signal, but by keeping the bottle sealed, multiple calibrations or unknown sampling can occur.

The disclosure, in part, pertains to an apparatus for transporting a volatile material that includes a vial configured to contain a sample of the volatile material dissolved in a solvent; and an airtight container which contains the vial. The vial may contain the volatile material dissolved in the solvent, and 0.1 mg of the volatile material is dissolved in 0.1 ml of the solvent. In the disclosure, the solvent may be selected from water, methanol, ethanol, propanol, isopropanol, butanol, isobutanol, tert-butanol, acetone, methyl ethyl ketone, dimethyl sulfoxide ethylene glycol, propylene glycol, ethylene glycol monomethylether acetate or propylene glycol monomethylether acetate. The vial and container may be labeled. The vial may have a screw cap of septum.

BRIEF DESCRIPTION OF THE DRAWINGS

The accompanying figures, in which like reference numerals refer to identical or functionally similar elements throughout the separate views and which are incorporated in and form a part of the specification, further illustrate the embodiments and, together with the detailed description, serve to explain the embodiments disclosed herein.

DETAILED DESCRIPTION

Figure 1:
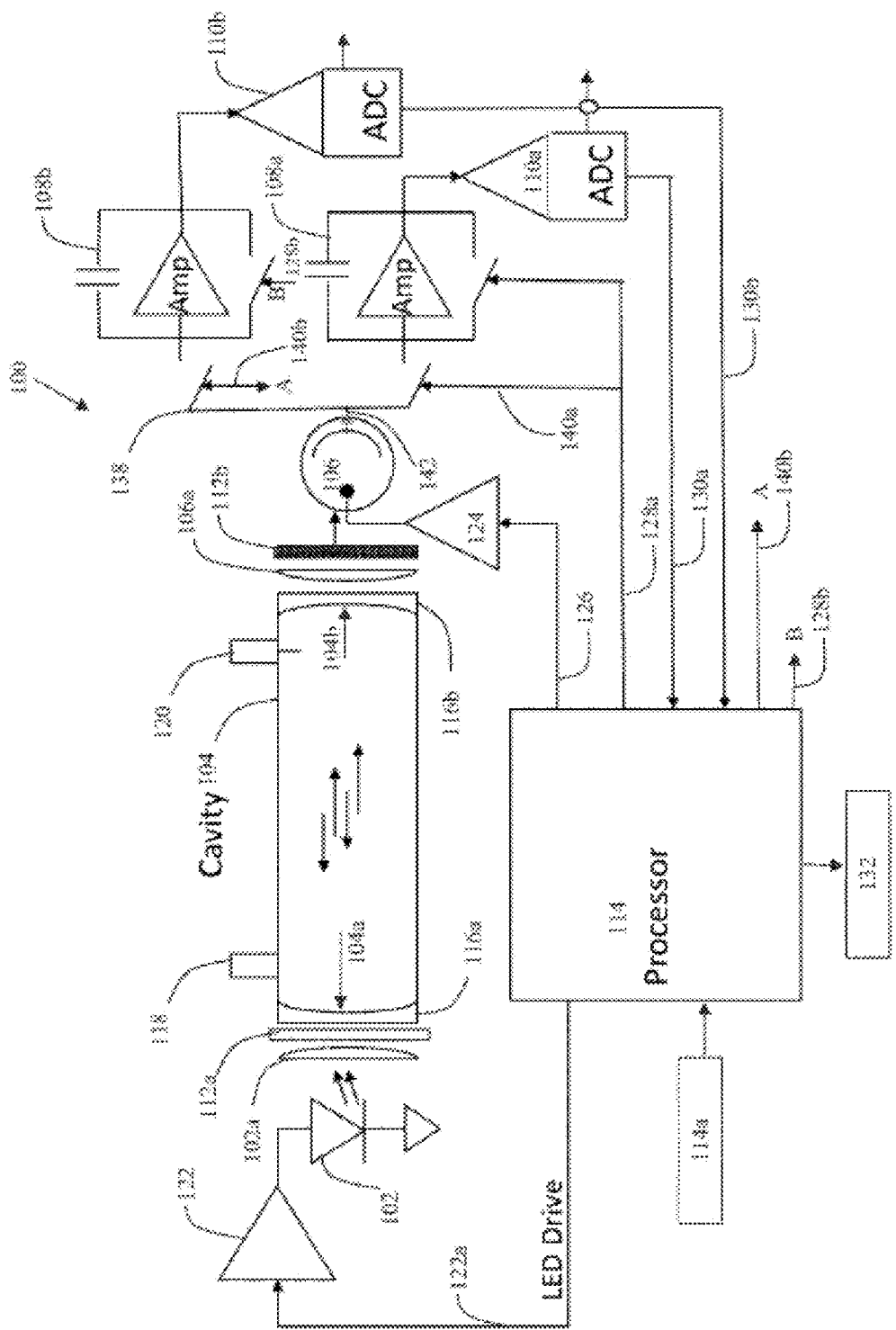
FIG. 1 shows a block diagram of a Cavity Ring Down Spectrometer (CRDS) analyzer according to embodiments of the disclosure

The particular values and configurations discussed in the following non-limiting examples can be varied and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope and concept of the invention as defined by the appended claims.

The technology of the present disclosure is based upon the propensity of vials to not be completely air tight. That is, small milligram or microgram levels of materials may diffuse out of the vial into the surrounding environment.

This technology is rendered viable due to the high sensitivity of spectral analyzers. An example is the CRDS according to an embodiment shown in the block diagram of FIG. 1.

As shown in FIG. 1 in block diagram format, principle components of CRDS 100 generally include a light source 102, an optical cavity 104, a detector 106, a first integrator 108a, a second integrator 108b and a converter 110. Light source 102 with the aid of an associated lens or lenses 102a may be directed toward a proximal end 104a of optical cavity 104 while a distal end 104b of optical cavity 104 may be directed toward detector 106 with the aid of an associated lens 106a. In one embodiment, a bandpass filter 112a is positioned between light source 102 and proximal end 104a of optical cavity 104, and/or a bandpass filter 112a is positioned between distal end 104b of optical cavity 104 and detector 106 and/or proximate to the detector 112b. Detector 106 is in gated electrical communication through the switching circuitry 138, e.g., one or more field effect transistors, with integrators 108a and 108b. The integrators 108a and 108b are in electrical communication with the respective converter 110a and 110b. All components (i.e., light source 102, optical cavity 104, detector 106, integrators 108a and 108b, and converters 110a and 110b) are in electronic communication with and controlled and/or driven by a processing or controlling component, generally referred to in the figure as computer 114. An oscillator 114a may be utilized to provide a stable and accurate timing source for computer 114 instruction stepping and timing and, in turn, for the gated integration measurement intervals according to aspects disclosed herein.

The light escaping from distal end 104b of optical cavity 104 is focused on to detector 106 with the aid of lens 106a which in turn converts the photons from the light into electrons. Detector 106 collects the photons emitted from optical cavity 104 only when gated (i.e., driven ON by an amplified buffer 124). During a single ON-OFF event, portions of two separate measurements made. During a portion of the ON event, the output from the detector is directed, e.g., gated or switched into electrical communication 138 with a first integration circuit 108a. During this time the current 142 flowing from the detector 106 is integrated by integrator 108a. Immediately after the ON event the light source 102 is switched off by processor 114 to produce an OFF event. During a portion of the OFF event, the output of the detector 106 is directed through the gating circuit 138 to the second integrator 108b. The current 142 flowing from the detector 106 is then integrated by integrator 108b. A plurality of ON-OFF events are conducted during a single integration period of time. The sum of each of the currents from each of the portions of an ON event obtained during the integration time are integrated to produce an electronic signal which represents a total ring up time. The sum of each of the currents from each of the portions of an OFF event, obtained during this same integration time, are integrated to produce an electronic signal which represents a total ring down time. The gating circuit 138 is controlled by the processor 114 via communication links 140a and 140b. The sample time signal output (arrow 126) from computer 114 to detector 106 defines this gated detection time. Each ON event and OFF event produces a small current sample which is collected by integrators 108a and 108b. This process is repeated over, for example, ten-thousand to one hundred thousand times during a single integration period of time, (e.g., 10-100 μs ON-OFF cycle time over an integration period of time of about 0.1 to 1 second) which in turn creates a significant output voltage at integrators 108a and 108b. The output voltage is then measured by a corresponding converter 110a or 110b, each of which may be, for example, a high-resolution analog-to-digital (ADC) converter. After the end of the previous measurement cycle (integration period of time) and before the beginning of the next measurement cycle, the integrators 108a and 108b and the corresponding circuitry may be reset (arrows 128a and 128b) by computer 114 and the initial output voltage of the integrators 108a and 108b may be measured by converters 110a and 110b, respectively, e.g., the initial output voltage of integrator 108a and 108b is measured between cycles. Measuring the initial output voltage of the integrator is more accurate than assuming the reset output voltage is "zero".

In one or more embodiments, the cavity ring down measurement system further comprises a first dual N-channel and dual P-channel MOSFET pair connected to the detector for receiving a first detection signal; a first operational amplifier having a positive input for receiving a first dual N-channel and dual P-channel MOSFET pair output signal and a negative input for receiving a first operational output signal and a second dual N-channel and dual P-channel MOSFET pair electrically connected to the first operational output signal; and wherein the second integrating circuit comprises: a third dual N-channel and dual P-channel MOSFET pair connected to the detector for receiving a second signal from the detector; a second operational amplifier having a positive input for receiving a third dual N-channel and dual P-channel MOSFET pair output signal and a negative input for receiving a second operational output signal; and a fourth dual N-channel and dual P-channel MOSFET pair electrically connected to the second operational output signal.

Furthermore, in embodiments the device utilizes an analysis method using a laser having a power output suitable to produce a factor of 4 improvement from 0.5 PPB of $NO_2$ to 120 PPT of $NO_2$, which for TNT results in a detection limit below 40 ppt. Reduction of systematic error may reduce that to near 75 PPT/2 seconds for $NO_2$, the photon limit with 25× improved mirrors which can produce a factor of 5 improvement. The simultaneous gated analysis further providing a factor of 2 improvement, along with a factor of 1.9 for the path-length and 1.5 intensity resulting in a factor of 2.3 improvement.

Figure 2:
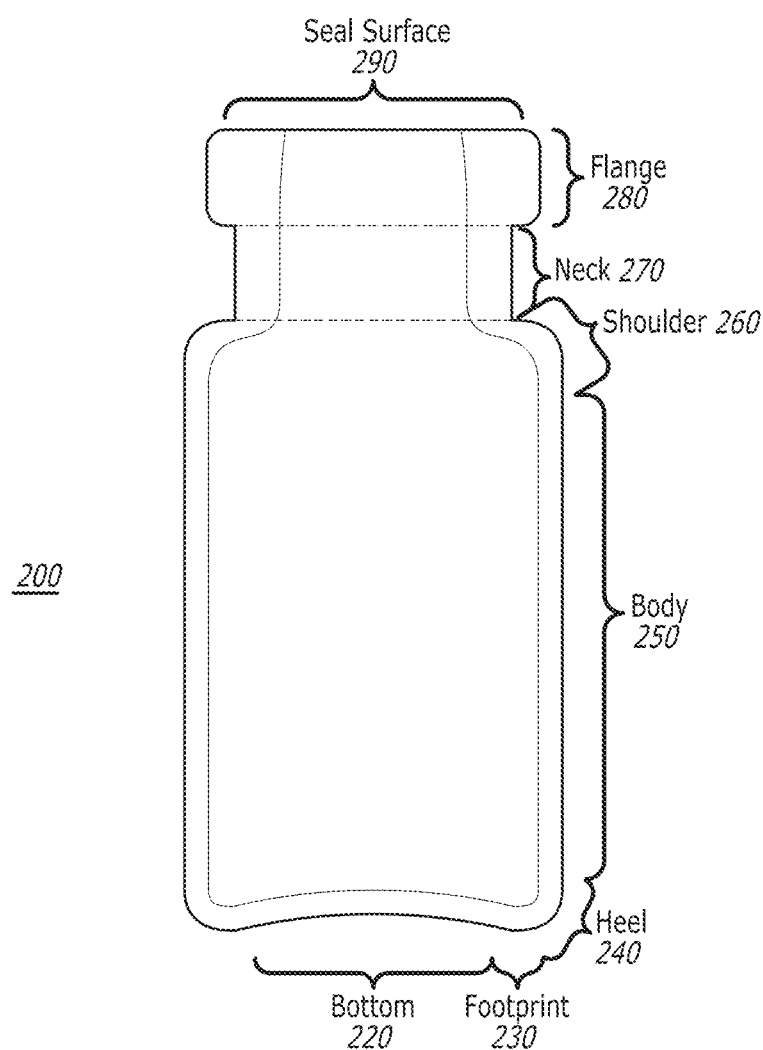
FIG. 2 depicts a vial according to an embodiment of the disclosure.
Figure 2:
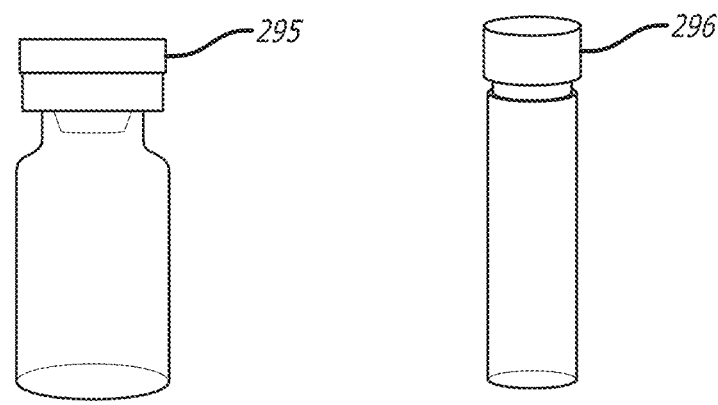

FIG. 2 illustrates a cross sectional view of the structure of a vial 200. The vial 200 has a bottom 220, which may be concave, i.e., curved to leave a footprint 230. A heel 240 leads to the body 250 which curves to a smaller diameter at the shoulder 260 to the neck 270. The vial is topped by a flange 280 having a seal surface 290. The vial can be sealed with a septum 295 or with a screw cap 296. The vial may be formed from glass, plastic or steel. The vial is characterized by having a small amount of leakage. The vial can have a volume of 10 ml. A 4 dram vial, for example, can have a height of 70 mm with the neck having a diameter of 21 mm.

Figure 3:
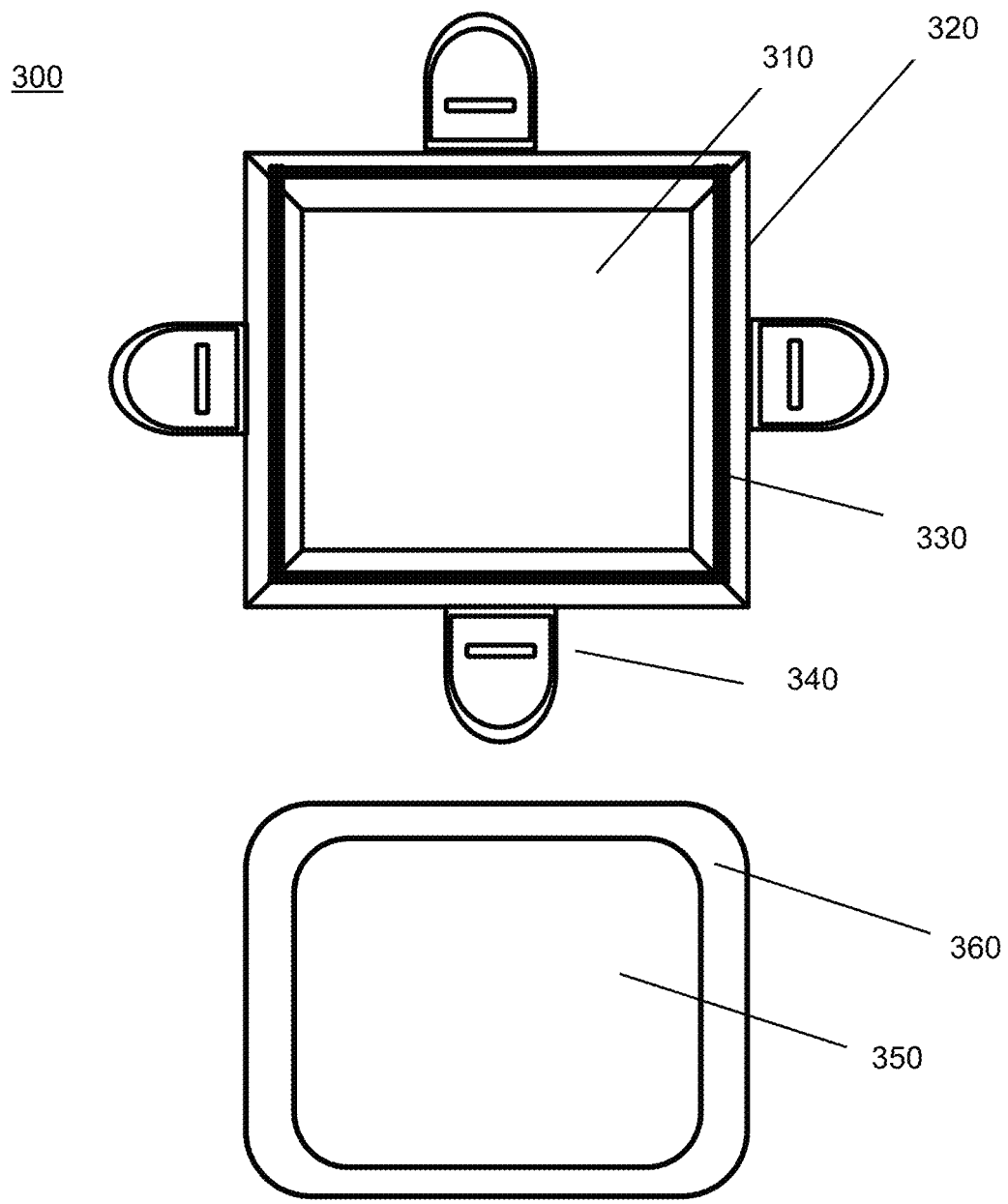
FIG. 3 depicts an airtight container according to an embodiment of the disclosure.

FIG. 3 illustrates an overhead view of an outer container 300 according to an embodiment of the disclosure. The outer container includes a recess in the bottom 310 to accommodate a vial. A top flange 320 has a groove that is fitted with a gasket or o-ring 330. There are four sealing tabs 340 arranged at the periphery of the outer container. The top 350 of the container includes a flange 360 that is configured to provide a tight seal with the gasket or o-ring.

Figure 4:
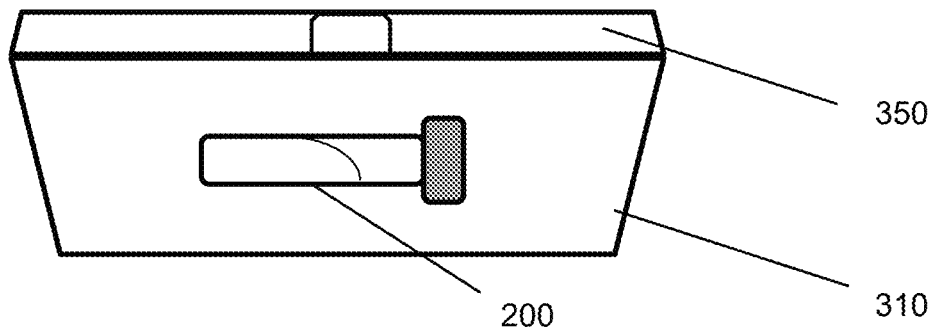
FIG. 4 depicts the vial sealed inside the container according to an embodiment of the disclosure.
Figure 4:
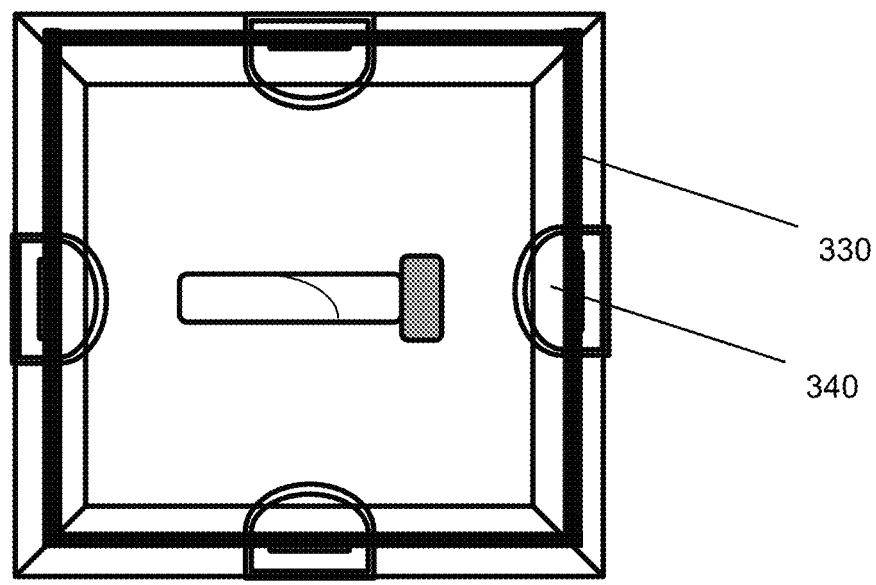

FIG. 4 shows a view of the vial 200 sealed inside the container by the sealing tabs. The vial 200 can be seen through the bottom 310 (or the top) of the container. The top 350 is sealed with the flanges. The overhead view shows the vial sealed inside the container by flanges 340 with the gasket or o-ring 330 giving an airtight seal, so that the explosive leaking from the cap of the vial can form an equilibrium with the atmosphere inside the container, which can be air or in inert gas such as nitrogen or argon.

Figure 5:
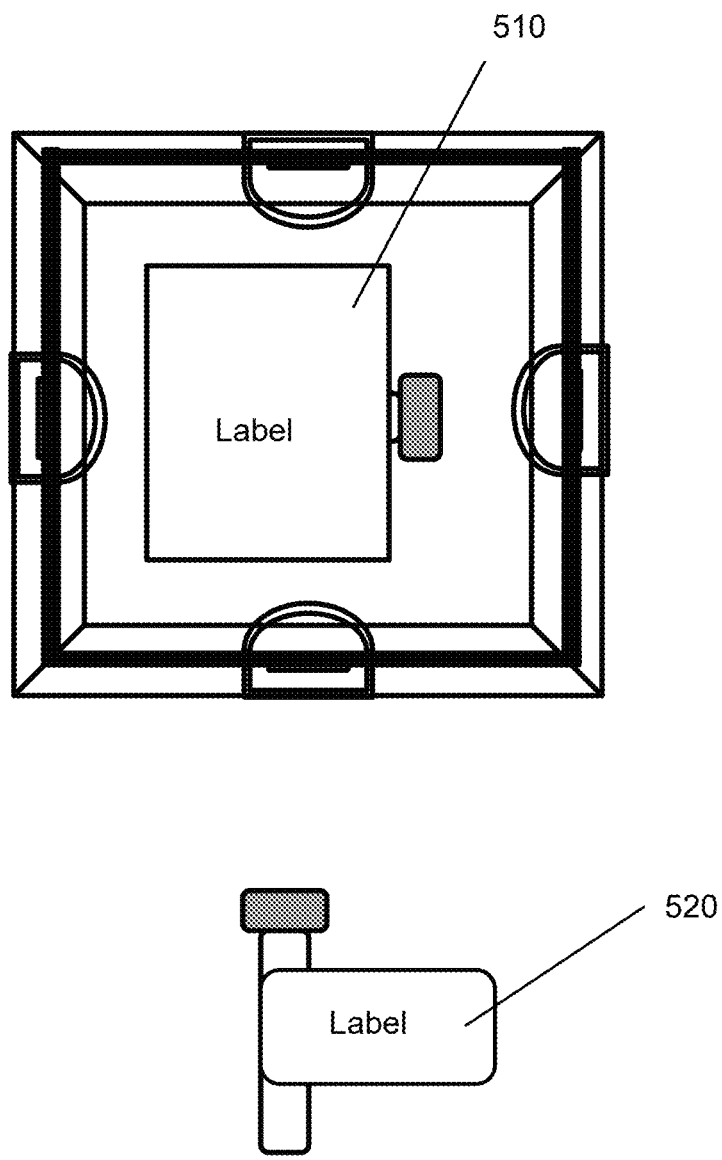
FIG. 5 depicts labels on the vial and the container according to an embodiment of the disclosure.
Figure 6:
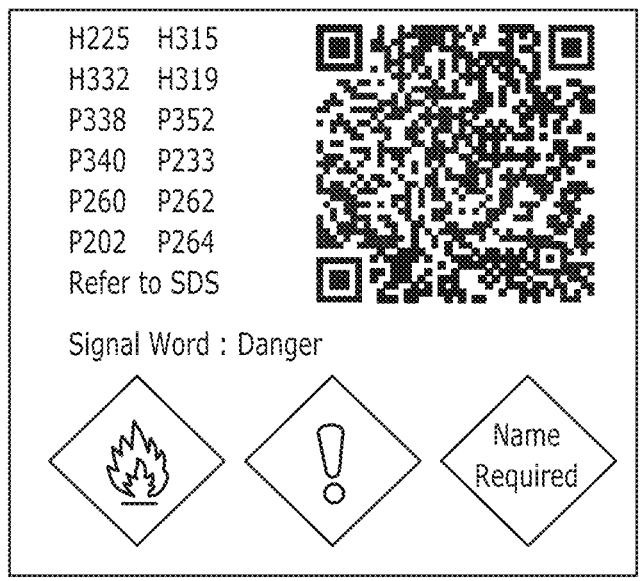
FIG. 6 shows labels according to an embodiment of the disclosure.
Figure 6:
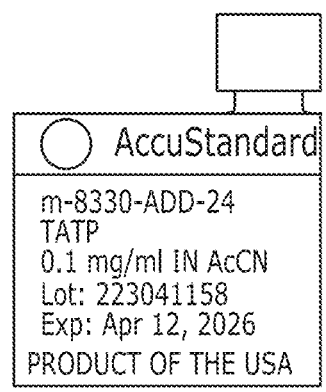

FIG. 5 shows labels 510 for the container and a separate label 520 for the vial itself. The labels are to identify the contents, its provenance and the concentration of the explosive in the solvent. The labels can also show chain of title, danger icons and expiration date. A bar code or QR code can also be included on the labels. FIG. 6 shows examples of labels.

A typical preparation would be to dissolve an 0.1 mg sample of explosive in 0.1 ml of ethanol and put it in in a vial 10, for example a septum vial. The vial is than placed in a leak-tight plastic container 200 which creates an enclosed space where the natural leakage from the bottle is sufficient for our sensitive detector to detect. The sample can last as long as the shelf life of the original sample. The leak tight plastic container containing the vial can then be transported to the analyzer for a spot test. The solvent is not restricted to ethanol, and any appropriate solvent may be used, such as water, methanol, ethanol, propanol, isopropanol, butanol, isobutanol, tert-butanol, acetone, methyl ethyl ketone, dimethyl sulfoxide ethylene glycol, propylene glycol, ethylene glycol monomethylether acetate or propylene glycol monomethylether acetate. The preparation is not restricted to 0.1 mg of sample in 0.1 ml of solvent. Other preparations include dissolving 0.05 mg of explosive in 0.1 ml of solvent or 0.15 mg of explosive in 0.1 ml of solvent. The amount of solvent is not restricted, and up to 1 ml of solvent may be present in the vial. The solvent may be filtered to remove particulates, for example with a 2 μm filter. If water is the solvent, the water can be distilled water or ultrapure 18.2 MΩ-cm water.

Shipping an explosive is an issue that is resolved by the disclosure. If an explosive is sufficiently dilute in a solvent, the shipping requirements are only for the solvent. Moreover, if a vial has a small enough quantity of liquid to be described as damp, the presence of liquid may also be considered negligible. In the disclosure, there is only 100 μL of solvent and 100 nanograms of explosive. In contrast, with pure explosive, any quantity is considered to be meaningful for shipping purposes.

After the vial is placed in the container and the container is sealed, a small amount of explosive will diffuse out of the cap or septum and equilibrate with the atmosphere inside the container. After equilibration, which usually takes from 10 minutes to 24 hours, there will be about 1 to 100 ppm of explosive present in the atmosphere inside the container. There can be less than 1 ppm of explosive present in the atmosphere inside the container. This level of explosive is sufficient for the measurement device or sensor. If a cavity ring-down spectrometer is used for measurement, the sensitivity of the measurement can be in the parts per trillion (PPT) level.

It is unnecessary to open the vial for measurement of its contents. There is sufficient leakage from the cap or septum for measurement once the explosive has been converted to NO$_2$. This is true when there is sufficient head space inside of the vial, i.e., there is a small sample less than 1 ml and can be as small as 0.1 ml. Keeping the sample sufficiently small will enable shipping through the United States mail or other shipping companies such as UPS or FEDEX without the exhaustive paperwork required for shipping explosives. That is, there would be no explosion danger with very small samples.

The measurement device is an explosives detector. The cover of the container is opened, and the measurement device draws in a sample at 100 mL per minute, and an inlet gooseneck tube (not shown) is held next to the cover as it is opened. After a fraction of a second to a few seconds, the cover is closed so as to be able to be used again in a short span of time.

This can be an important test, because if the filter is contaminated, there may be no response, despite everything appearing to be working. A negative result indicates that a troubleshooting procedure needs to be initiated.

Initially, it was foreseen that that a sample in a sealed container would be concealed, but there also optionally needs to be visual confirmation that there is not a sealed container either by opening a backpack or by scanning with x-rays or mm wave.

The methodology can be used to test for a number of explosives. These explosives include RDX (cyclotrimethylene trinitramine—$C_3H_6N_6O_6$), which has the lowest vapor pressure MP=205.5° C., BP=234° C. RDX has the following chemical structure:

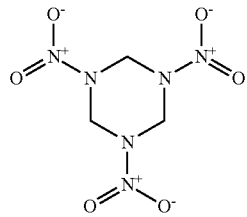 [SMILES: O=[N+]([O-])N1CN([N+](=O)[O-])CN([N+](=O)[O-])C1]

Other explosives can also be tested. These explosives include TNT (trinitrotoluene), ammonium nitrate explosive mixtures, Ammonium perchlorate explosive mixtures, Ammonium picrate, BEAF [1,2-bis-(2, 2-difluoro-2-nitroacetoxyethane)], black powder, BTNEC [bis (trinitroethyl) carbonate], BTNEN [bis (trinitroethyl) nitramine], BTTN [1,2,4-butanetriol trinitrate], calcium nitrate explosive mixture, cellulose hexanitrate explosive mixture, chlorate explosive mixtures, cyclotetramethylenetetranitramine [HMX], DATB [diaminotrinitrobenzene], DDNP [diazodinitrophenol], DEGDN [diethyleneglycol dinitrate], Dimethylol dimethyl methane dinitrate composition, dinitroethyleneurea, dinitroglycerine [glycerol dinitrate], dinitrophenol, dinitrophenolates, dinitrophenyl hydrazine, dinitroresorcinol, dinitrotoluene-sodium nitrate explosive mixtures, DIPAM [dipicramide; diaminohexanitrobiphenyl], dipicryl sulfide [hexanitrodiphenyl sulfide], dipicryl sulfone, dipicrylamine, DNPA [2,2-dinitropropyl acrylate], DNPD [dinitropentano nitrile], EDDN [ethylene diamine dinitrate], EDNA [ethylenedinitramine], ednatol, EDNP [ethyl 4,4-dinitropentanoate], EGDN [ethylene glycol dinitrate], erythritol tetranitrate explosives, esters of nitro-substituted alcohols, ethyl-tetryl, tetranitromethane (nitroform), fulminate of mercury, fulminate of silver, gelatinized nitrocellulose, guanyl nitrosamino guanyl tetrazene, guanyl nitrosamino guanylidene hydrazine, guncotton, hexanitrodiphenylamine, hexanitrostilbene, [hexamethylenetriperoxidediamine], HMX [cyclo-1,3,5,7-tetramethylene, 2,4,6,8-tetranitramine; octogen], KDNBF [potassium dinitrobenzo-furoxane], Lead azide, Lead mannite, lead mononitroresorcinate, lead picrate, mannitol hexanitrate, MDNP [methyl 4,4-dinitropentanoate], MEAN [monoethanolamine nitrate], mercuric fulminate, mercury oxalate, mercury tartrate, metriol trinitrate, MMAN [monomethylamine nitrate]; methylamine nitrate, mononitrotoluene-nitroglycerin mixture, NIBTN [nitroisobutametriol trinitrate], Nitrate sensitized with gelled nitroparaffin, nitrated carbohydrate explosive, nitrated glucoside explosive, nitrated polyhydric alcohol explosives, nitric acid and a nitro aromatic compound explosive, nitric acid and carboxylic fuel explosive, nitric acid explosive mixtures, nitro aromatic explosive mixtures, nitro compounds of furane explosive mixtures, nitrocellulose explosive, nitroderivative of urea explosive mixture, nitrogelatin explosive, nitrogen trichloride, nitrogen tri-iodide, nitroglycerine [NG, RNG, nitro, glyceryl trinitrate, trinitroglycerine], nitroglycide, nitroglycol [ethylene glycol dinitrate, EGDN], nitroguanidine explosives, nitronium perchlorate propellant mixtures, nitroparaffins explosive grade and ammonium nitrate mixtures, nitrostarch, nitro-substituted carboxylic acids, nitrotriazolone [3-nitro-1,2,4-triazol-5-one], nitrourea, silver acetylide, silver azide, silver fulminate, silver oxalate explosive mixtures, silver styphnate, silver tartrate explosive mixtures, silver tetrazene, sodium azide explosive mixture, sodium dinitro-ortho-cresolate, sodium nitrate explosive mixtures, sodium nitrate-potassium nitrate explosive mixture, sodium picramate, tacot [tetranitro-2,3,5,6-dibenzo-1, 3a,4,6a-tetrazapentalene], TATB [triaminotrinitrobenzene], TATP [triacetonetriperoxide], TEGDN [triethylene glycol dinitrate], tetranitrocarbazole, tetrazene [tetracene, tetrazine, 1-(5-tetrazolyl)-4-guanyl tetrazene hydrate], tetrazole explosives, tetryl [2,4,6-tetranitro-n-methylaniline], tetrytol, thickened inorganic oxidizer salt slurried explosive mixture, TMETN [trimethylolethane trinitrate], TNEF [trinitroethyl formal], trimethylol ethyl methane trinitrate composition, trimethylolthane trinitrate-nitrocellulose, trimonite, trinitroanisole, trinitrobenzene, trinitrobenzenesulfonic acid [picryl sulfonic acid], trinitrobenzoic acid, trinitrocresol, trinitrofluorenone, trinitro-meta-cresol, trinitronaphthalene, trinitrophenetol, trinitrophloroglucinol, trinitroresorcinol, tritonal and urea nitrate.

Among the explosive detection methods of the disclosure is Thermal Decomposition Cavity Ring-Down Spectroscopy (TD-CRDS). TD-CRDS is a form of laser absorption spectroscopy that utilizes a thermal decomposition cavity in a uv-visible spectrometer that utilizes screen mirrors, lasers, filters and a sample cell. A typical CRDS setup is formed from a laser that is used to illuminate a high-finesse optical cavity, which in its simplest form consists of two or three highly reflective mirrors. When the laser is in resonance with a cavity mode, intensity builds up in the cavity due to constructive interference. The laser is then turned off in order to allow the measurement of the exponentially decaying light intensity leaking from the cavity. During this decay, light is reflected back and forth thousands of times between the mirrors giving an effective path length for the extinction on the order of a kilometer. When the light is turned back on, the buildup of light can also be measured as an indication of the time constant.

If a light-absorbing material is now placed in the cavity, the mean lifetime decreases as fewer bounces through the medium are required before the light is fully absorbed, or absorbed to some fraction of its initial intensity. A TD-CRDS setup measures how long it takes for the light to decay to 1/e of its initial intensity, and this "ringdown time" can be used to calculate the concentration of the absorbing substance in the gas mixture in the cavity. There may be extra steps to reduce the noise to close to the photon limit.

Figure 7:
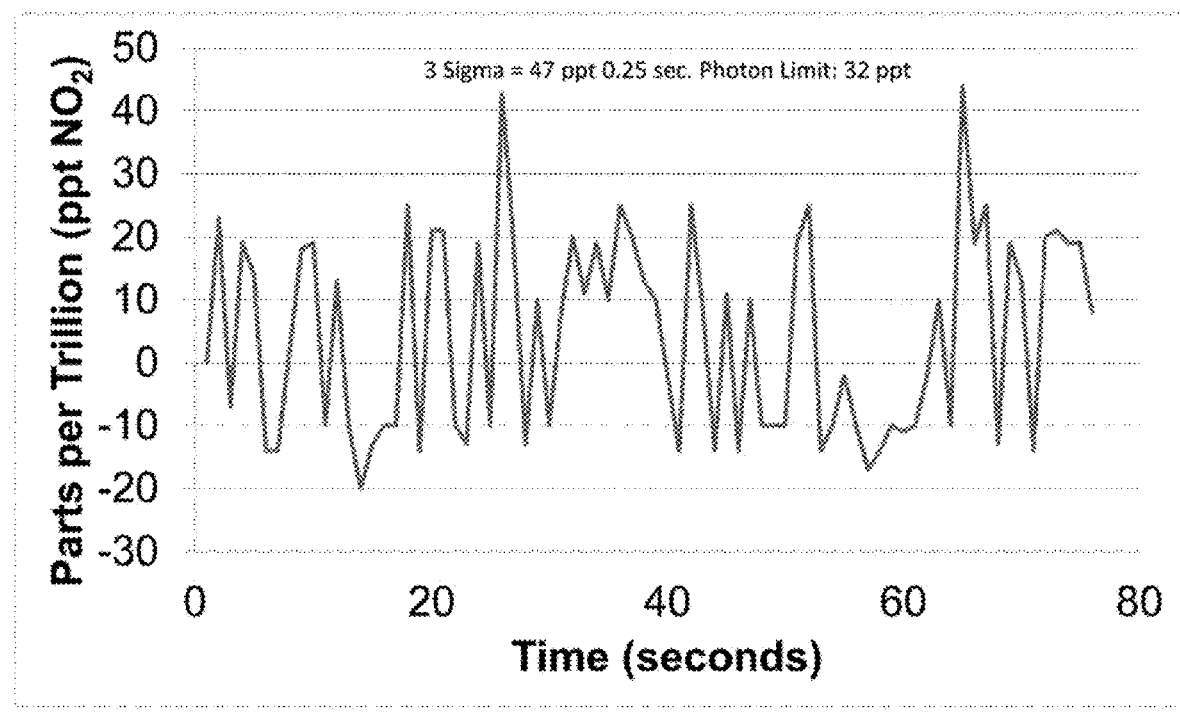
FIG. 7 is a graph showing the signal to noise detection limit of a CRDS according to an embodiment of the disclosure.

A CRDS detector is at least a 1000 times more sensitive than a flame ionization detector (FID). FIG. 7 shows the threshold level for TNT for a CRDS measurement of a sample according to an embodiment of the disclosure. As can be seen, TNT is detected close to the photon limit with a sensitivity of 9 parts per trillion (PPT) at a path length of 937 m. Further adjustments to the CRDS detector can bring the sensitivity down to a 1 PPT level or lower. At these levels, there is no need to open the vial or the package containing the vial.

Figure 8:
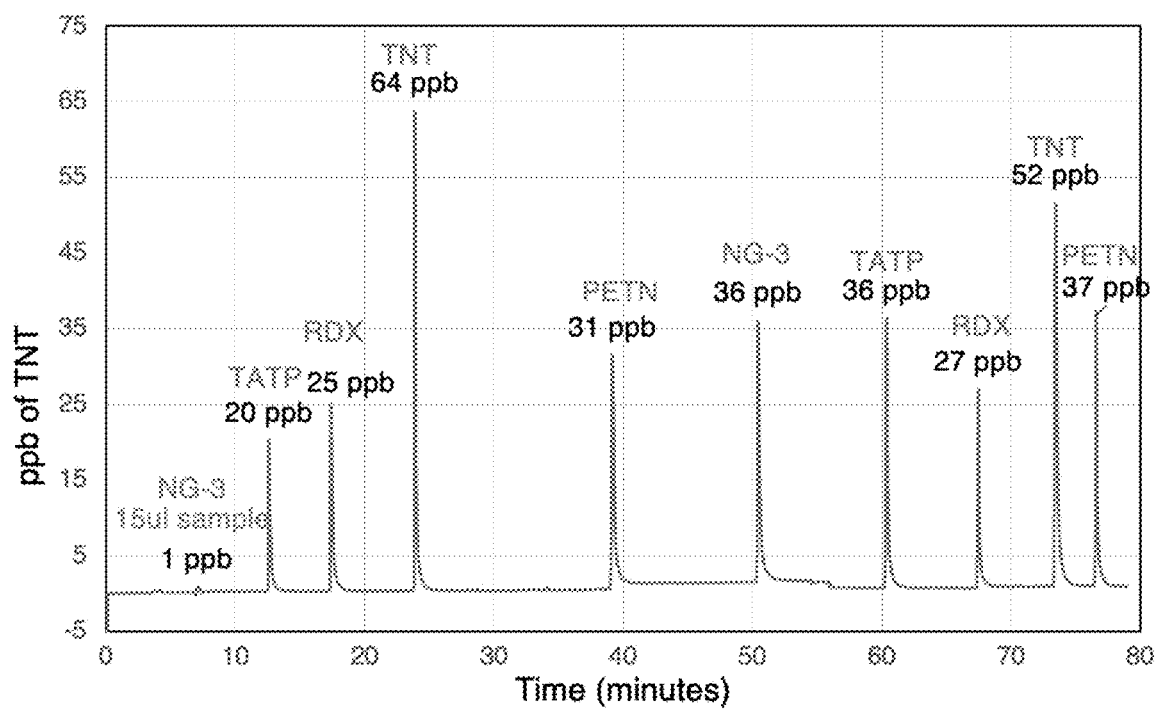
FIG. 8 is a graph showing detection limits of a CRDS according to an embodiment of the disclosure.

This high level of sensitivity as achievable for a wide range of explosive materials, as can be seen in FIG. 8. A high level of sensitivity with residence time was observed for materials that included nitroglycerin (NG), hexahydro-1,3, 5-trinitro-s-triazine (RDX), 2,4,6-trinitotoluene (TNT), triacetone triperoxide (TATP), and pentaerythritol tetranitrate (PETN). For each of these compounds, linearity measurements were taken, plotting the analyzers' responses to variable concentrations. Although many of the peaks are at 5 ppb or higher, the bottom of the peaks indicate that sensitivity down the PPT level is possible. A 15 μl sample of NG displayed a sensitivity of 1 PPB. Thermal decomposition can also have a peroxy radical chain amplification effect so that multiple $NO_2$ molecules come from each generated radical with the addition of NO and the presence of atmospheric oxygen.

Other detection methods besides CRDS may be utilized. Testing of small samples of explosives includes complicated analytical systems, for examples a mass spectrometer. The mass spectrometer fulfils the main performance requirements of an explosive detection system, which includes sensitivity, selectivity, and speed of analysis. In addition, there are requirements of mobility and cost as well. The mass spectrometers have become a lot smaller, mobile, and less expensive during recent years. Various mass spectrometer configurations have been used, which includes ion traps, quadrupoles, and Time-of-Flight (ToF) analyzers and tandem mass spectrometers (MS/MS) combinations for the purpose of detection of explosives.

Mass spectrometry deals with the separation and analysis of substances according to the masses of atoms and molecules of which the substance is composed. There are two basic methods of separation and analysis, which include methods based on time separation and the methods based on geometric separation. The time separation method is based on the fact that ions having different m/e ratios have different times of flight and are thus collected one after the other. While on the other hand, in the geometric separation method, ions having different m/e ratios are separated according to their geometric position at the collecting spot. Because of its high sensitivity and selectivity, the mass spectrometry has always shown great potential for vapor and trace detection of explosives.

Other methods to detect and characterize explosives include visual detection fluorescence methods that are simple, have fast detection times as well as the possibility of the fine structural tuning of chemosensor/sensory material to improve the selectivity and/or desired photophysical properties. Other physical methods can include chromatographic methods, high-performance liquid chromatography, (surface-enhanced) Raman spectroscopy, terahertz spectroscopy, absorption photoacoustic spectroscopy, immunoassay electrochemical methods. Fluorescence-chemosensors based methods are also considered to be viable. Other methods include detection of traces of explosives by means of Fourier Transform Infrared Spectroscopy (FTIR).

The technology of the disclosure can be used to train explosive sniffing dogs. Trained dogs are incredible chemical sensors, far better at detecting explosives, narcotics and other substances than even the most advanced technological device. But one challenge is that dogs have to be trained, and training them with real hazardous substances can be inconvenient and dangerous.

Conventional technology, such as been developed by NIST scientists, have addressed this problem using a jello-like material called polydimethylsiloxane, or PDMS for short. PDMS absorbs odors and releases them slowly over time. Enclose it in a container with an explosive or narcotic for a few weeks until it absorbs the odors, and one can then use it to safely train dogs to detect the real thing.

The present disclosure utilizes a simpler and faster technology, where the sample is ready for use to train the dog as quickly as about 10 minutes.

The technology of the disclosure is not restricted to explosives. Any compound that has even a trace volatility can be detected and quantified. The PPT sensitivity renders this technology for the detection of narcotics such as morphine, heroin and fentanyl, hallucinogens including LSD, PCP, mescaline, MDA and psilocybin, and illegal pharmaceuticals such as steroids. Also, the animal training protocols include exposing the animal to interfering scents such as vanilla, peanut butter, rose, mint, clove, pepper, etc, Animal scents used in dog training include bear, duck, dove, fox, goose, grouse, pheasant, quail, rabbit, raccoon, squirrel, and wild boar.

While various aspects have been described above, it should be understood that they have been presented by way of example only, and not limitation. Thus, the breadth and scope of an aspect of the present invention should not be limited by any of the above-described exemplary aspects, but should be defined only in accordance with the following claims and their equivalents.

What is claimed is:

1. An apparatus for transporting and sampling an explosive, comprising:
   a leaky vial configured to contain a sample of the explosive dissolved in a solvent; and
   an airtight container which contains the vial, explosive leaking from the vial equilibrating with an atmosphere inside the airtight container, wherein the apparatus is configured to transport Claim A explosives, Class B explosives or Class explosives.

2. The apparatus of claim 1, wherein the vial contains the explosive dissolved in the solvent.

3. The apparatus of claim 1, wherein 0.1 mg of the explosive is dissolved in 0.1 ml of the solvent.

4. The apparatus of claim 1, wherein the solvent is selected from the group consisting of water, methanol, ethanol, propanol, isopropanol, butanol, isobutanol, tert-butanol, acetone, methyl ethyl ketone, dimethyl sulfoxide, ethylene glycol, propylene glycol, ethylene glycol monomethylether acetate and propylene glycol monomethylether acetate.

5. The apparatus of claim 1, wherein the vial has a label.

6. The apparatus of claim 1, wherein the air tight container has a label.

7. The apparatus of claim 1, wherein the vial has a screw cap.

8. The apparatus of claim 1, wherein the vial has a septum.

9. The apparatus of claim 1, wherein the vial is formed from glass or plastic.

10. The apparatus of claim 1, wherein the airtight container is formed from plastic.

11. The apparatus of claim 1 where the sample is introduced to the vial by a swab.

12. The apparatus of claim 1 where the sample is a subdivided commercially available reference standard.

13. The apparatus of claim 1, wherein the apparatus is configured to be sampled by a cavity ring-down spectrometer.

14. The apparatus of claim 1, wherein the explosive is selected from the group consisting of cyclotrimethylene trinitramine, ammonium perchlorate, ammonium picrate, 1,2-bis-(2,2-difluoro-2-nitroacetoxyethane), black powder, bis (trinitroethyl) carbonate, bis (trinitroethyl) nitramine, 1,2,4-butanetriol trinitrate, calcium nitrate explosive mixture, cellulose hexanitrate explosive mixture, chlorate explosive mixtures, cyclotetramethylenetetranitramine, diaminotrinitrobenzene, diazodinitrophenol, diethyleneglycol dinitrate, dimethylol, dinitroethyleneurea, dinitroglycerine, dinitrophenol, dinitrophenolates, dinitrophenyl hydrazine, dinitroresorcinol, dinitrotoluene-sodium nitrate explosive mixtures, dipicramide; diaminohexanitrobiphenyl, dipicryl sulfide, dipicryl sulfone, dipicrylamine, 2,2-dinitropropyl acrylate, dinitropentano nitrile, ethylene diamine dinitrate, ethylenedinitramine, ednatol, ethyl 4,4-dinitropentanoate, ethylene glycol dinitrate, erythritol tetranitrate explosives, esters of nitro-substituted alcohols, ethyl-tetryl, tetranitromethane, fulminate of mercury, fulminate of silver, gelatinized nitrocellulose, guanyl nitrosamino guanyl tetrazene, guanyl nitrosamino guanylidene hydrazine, guncotton, hexanitrodiphenylamine, hexanitrostilbene, hexamethylenetriperoxidediamine, cyclo-1,3,5,7-tetramethylene, 2,4,6,8-tetranitramine; octogen, potassium dinitrobenzo-furoxane, lead azide, lead mannite, lead mononitroresorcinate, lead picrate, mannitol hexanitrate, methyl 4,4-dinitropentanoate, monoethanolamine nitrate, mercuric fulminate, mercury oxalate, mercury tartrate, metriol trinitrate, monomethylamine nitrate, methylamine nitrate, mononitrotoluene-nitroglycerin mixture, nitroisobutametriol trinitrate, nitrate sensitized with gelled nitroparaffin, nitrated carbohydrate explosive, nitrated glucoside explosive, nitrated polyhydric alcohol explosives, nitric acid and a nitro aromatic compound explosive, nitric acid and carboxylic fuel explosive, nitric acid explosive mixtures, nitro aromatic explosive mixtures, nitro compounds of furane explosive mixtures, nitrocellulose explosive, nitroderivative of urea explosive mixture, nitrogelatin explosive, nitrogen trichloride, nitrogen tri-iodide, nitroglycerine, nitroglycide, nitroglycol, nitroguanidine explosives, nitronium perchlorate propellant mixtures, nitroparaffins explosive grade and ammonium nitrate mixtures, nitrostarch, nitro-substituted carboxylic acids, 3-nitro-1,2,4-triazol-5-one, nitrourea, silver acetylide, silver azide, silver fulminate, silver oxalate explosive mixtures, silver styphnate, silver tartrate explosive mixtures, silver tetrazene explosive mixture, sodium azide explosive mixture, sodium dinitro-ortho-cresolate, sodium nitrate explosive mixtures, sodium nitrate-potassium nitrate explosive mixture, sodium picramate, tetranitro-2,3,5,6-dibenzo-1,3a,4,6a-tetrazapentalene, triaminotrinitrobenzene, triacetonetriperoxide, triethylene glycol dinitrate, tetranitrocarbazole, tetrazene tetracene, tetrazine, 1(5-tetrazolyl)-4-guanyl tetrazene hydrate, tetrazole explosives, tetryl 2,4,6-tetranitro-n-methylaniline, tetrytol, thickened inorganic oxidizer salt slurried explosive mixture, trimethylolethane trinitrate, trinitroethyl formal, trimethylol ethyl methane trinitrate composition, trimethylolthane trinitrate-nitrocellulose, trimonite, trinitroanisole, trinitrobenzene, trinitrobenzenesulfonic acid picryl sulfonic acid, trinitrobenzoic acid, trinitrocresol, trinitrofluorenone, trinitro-meta-cresol, trinitronaphthalene, trinitrophenetol, trinitrophloroglucinol, trinitroresorcinol, tritonal and urea nitrate.

15. A method of transporting and measuring an explosive, comprising:

providing the apparatus of claim 1, dissolving 0.1 mg of the explosive in 0.1 ml of the solvent in the vial;

sealing the vial in the airtight container;

allowing of the explosive in the solvent in the vial to equilibrate with an atmosphere inside the airtight container;

opening the airtight container; and measuring an amount of explosive using a cavity ring-down spectrometer.

16. The method of claim 15, wherein the atmosphere in the airtight container is sampling with a wand connected to the cavity ring-down spectrometer.

17. An apparatus for transporting and sampling a volatile material, comprising:

a vial configured to contain a sample of the volatile material dissolved in a solvent, the volatile material leaking from the vial equilibrating with an atmosphere inside the airtight container; and an airtight container which contains the vial, wherein the apparatus is configured for transport in accordance with Federal statute.

18. The apparatus of claim 17, wherein the vial contains the volatile material dissolved in the solvent.

19. The apparatus of claim 17, wherein 0.1 mg of the volatile material is dissolved in 0.1 to 1 ml of the solvent.

20. The apparatus of claim 17, wherein the solvent is selected from the group consisting of water, methanol, ethanol, propanol, isopropanol, butanol, isobutanol, tert-butanol, acetone, methyl ethyl ketone, dimethyl sulfoxide ethylene glycol, propylene glycol, ethylene glycol monomethylether acetate and propylene glycol monomethylether acetate.

21. The apparatus of claim 17, wherein at least one of the air tight container or the vial has a label.

22. The apparatus of claim 17, wherein the vial has a screw cap or septum.

* * * * *